Sept. 6, 1949. S. K. ANDERSEN Re. 23,144

COOLER FOR VISCOUS LIQUIDS

Original Filed March 10, 1945 5 Sheets-Sheet 1

COOLER FOR VISCOUS LIQUIDS

Original Filed March 10, 1945 5 Sheets-Sheet 2

Inventor:
SOREN K. ANDERSEN.
By F. Weldon Wohann
Attorney.

COOLER FOR VISCOUS LIQUIDS

Original Filed March 10, 1945 5 Sheets-Sheet 3

Inventor:
SOREN K. ANDERSEN,
By
Attorney.

COOLER FOR VISCOUS LIQUIDS

Original Filed March 10, 1945 5 Sheets-Sheet 4

Inventor:
SOREN K. ANDERSEN,
By J. Lovelton Johnson
Attorney.

COOLER FOR VISCOUS LIQUIDS

Original Filed March 10, 1945 5 Sheets-Sheet 5

INVENTOR.
SOREN K. ANDERSEN
BY
ATTORNEY

Reissued Sept. 6, 1949

Re. 23,144

UNITED STATES PATENT OFFICE 23,144

COOLER FOR VISCOUS LIQUIDS

Soren K. Andersen, Los Angeles, Calif., assignor to The Garrett Corporation, Airesearch Manufacturing Company division, Los Angeles, Calif., a corporation of California Original No. 2,449,922, dated September 21, 1948, Serial No. 582,080, March 10, 1945. Application for reissue March 24, 1949, Serial No. 83,231

15 Claims. (Cl. 257—128)

This invention relates to coolers for liquids which are viscous when cold, and is particularly useful in oil coolers for aircraft engines.

Such oil coolers have as their primary function to regulate the temperature, and thus the viscosity, of the lubricating oil of an aircraft engine, and are required to perform this function under widely varying conditions of operation. At times they are burdened with a heavy cooling load, for example—when the temperature of the ambient air is high, and for this purpose the cooler must have a high heat exchange capacity. Consequently, it is customary to provide the cooler with a large number of tubes for the flow of a coolant, which tubes are spaced relatively closely together to provide restricted passages for the most efficient exchange of heat between the oil flowing through such passages and the coolant flowing through the tubes.

At other times the coolers may be required to operate in ambient air having a temperature far below zero, and in many cases the descent to such subzero temperatures may be quite abrupt, and under such conditions the mechanism which is usually provided for regulating the quantity of coolant flowing through the tubes, may not act quickly enough to prevent a rapid chilling of the tubes sufficient to cause the layers of oil adjacent the outer surfaces of the tubes to congeal thereagainst or to become so viscous as to adhere substantially immovably to such tube surfaces. In other cases, the aircraft may be forced to stand in subzero weather for sufficient length of time to permit the oil within the cooler core to thicken. Under such conditions, the resistance of the relatively restricted passages between the heat exchange tubes to the flow of the thickened oil therethrough, may become so great as to virtually prevent any substantial flow through said passages, even under the high pressures developed by the pumping apparatus of the oil circulating system. The restriction of the passages between the tubes by the congealment of layers of oil against the outer surfaces of the tubes, heightens this increased core resistance.

It is customary to employ, in such coolers, a warm up chamber in the nature of a bypass between the inlet and outlet of the cooler, which may be subjected, through suitable yielding valve means, to sufficient resistance to the flow of the oil therethrough to normally urge the flow through the cooler core, but operative to bypass the oil or a substantial portion thereof when the core resistance becomes abnormally high as aforesaid. The oil thus bypassed is not subjected to any substantial cooling effect and consequently may acquire and maintain a sufficiently high temperature to impart heat to the cooler for the purpose of thawing or reducing the viscosity of the thickened oil therein. The use of such warm up bypassing means has been quite common for a number of years, but even though supplied with such warming up means, coolers have often failed under severe operation conditions. In many cases, such coolers would, under severe low temperature operating conditions, display a progressive waxing of the tubes beginning in the center of the cooler and spreading outwardly, accompanied by a progressive localization of increasing high temperature oil at the periphery of the core adjacent the shell. It now appears that this was due to a haphazard arrangement of tube spacing, with restriction or stoppage of the flow in some areas and excess spacing in other areas, producing what may be termed "channeling" of the flow in overlarge spaces of inadequate flow resistance, resulting in an undesirably excessive bypassing of the flow in localized areas, and inadequate distribution into the core. Such bypassing aggravated the waxing in the more remote areas of the core.

Having in mind the foregoing problems, the general object of the present invention is to provide a cooler for liquids that are viscous when cold which is adapted to provide a maximum of forced distribution of the liquid into the core under congealment conditions wherein the layers of liquid adjacent the tube surfaces become so viscous as to adhere substantially immovably to the tube surfaces or to form waxed film thereon.

More specifically, it is an object of the invention to provide an oil cooler having coolant tubes which are spaced sufficiently closely to provide adequate cooling efficiency under heavy cooling loads, and yet which is adapted to maintain a path or paths of "free flow" through the cooler core from the inlet to the outlet in which the liquid is permitted not only to flow adjacent the jacketed walls which are warmed by the circulation of a heated fluid through a warm up chamber, but are also permitted and urged under pressure to penetrate the core so as to promote anticongealing and de-congealing flow into the heart of the core where the waxing has been previously most pronounced.

It is a further object to provide a cooler of the character described, having well defined flow passages between heated inner areas of the shell walls and tubes adjacent thereto, communicating with flow passages penetrating into the cooler core (preferably along the baffles which divide the core into flow chambers), all of said flow passages being of less flow resistance than the passages between the majority of the tubes and being unrestricted throughout their length and so connected to each other as to collectively define a "free flow" channel which not only extends substantially uninterruptedly from the inlet to the outlet of the cooler, but also penetrates into the core and is adapted to direct and urge the flow of warmed oil into the core.

A further object of the invention is to provide a cooler of the character set forth herein having one or more baffles with ports adjacent the ends thereof, and with supplementary ports spaced from the first named ports toward the center of the cooler and adapted to provide for a limited "bleeding" of liquid from one flow chamber to another, such as to facilitate the "free flow" circulation under congealment conditions.

A further object of the invention is to provide a cooler having a core which is composed of a purality of bundles of tubes separated by baffles, a portion of the tubes at the periphery of the core being of flattened cross section, such as to better "round out" the peripheral contour of the core, and in which at least some of the flattened tubes are provided, near their ends with portions of reduced thickness defining between them ports or apertures for establishing better communication between the "header" free flow passages adjacent the inner surface of the shell and the passage between the tubes.

The present invention is a continuation-in-part of my prior copending applications now abandoned, Serial No. 456,033, for Oil cooler having quick thaw-out means, filed August 25, 1942, and Serial No. 470,156, for Oil cooler, filed December 26, 1942.

Further objects and advantages of the invention will be brought out in the following parts of the specification.

Referring to the drawings which are for illustrative purposes only,

Figure 1:
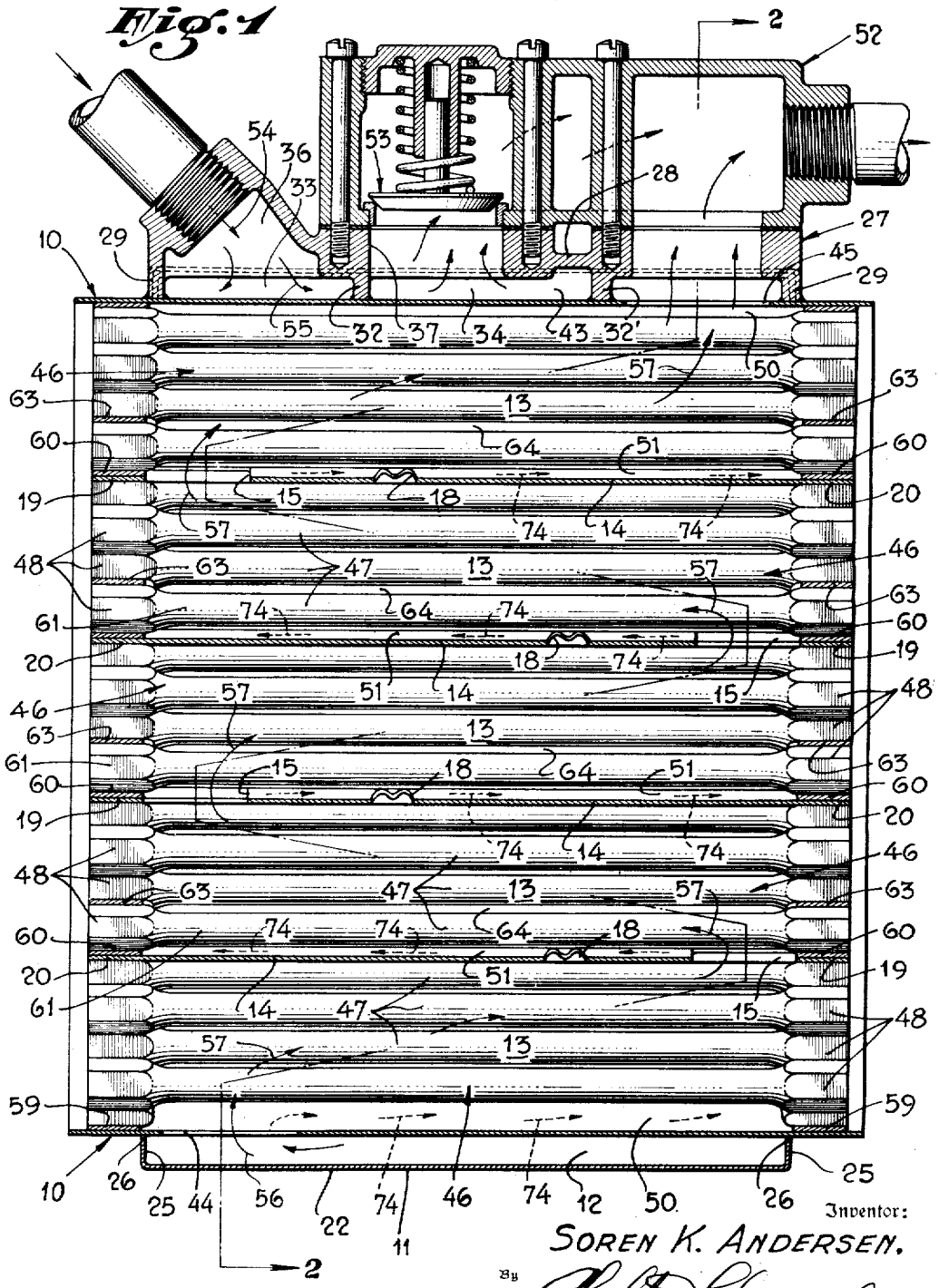
Fig. 1 is a sectional view of the cooler taken on the vertical longitudinal median plane of the cooler.
Figure 2:
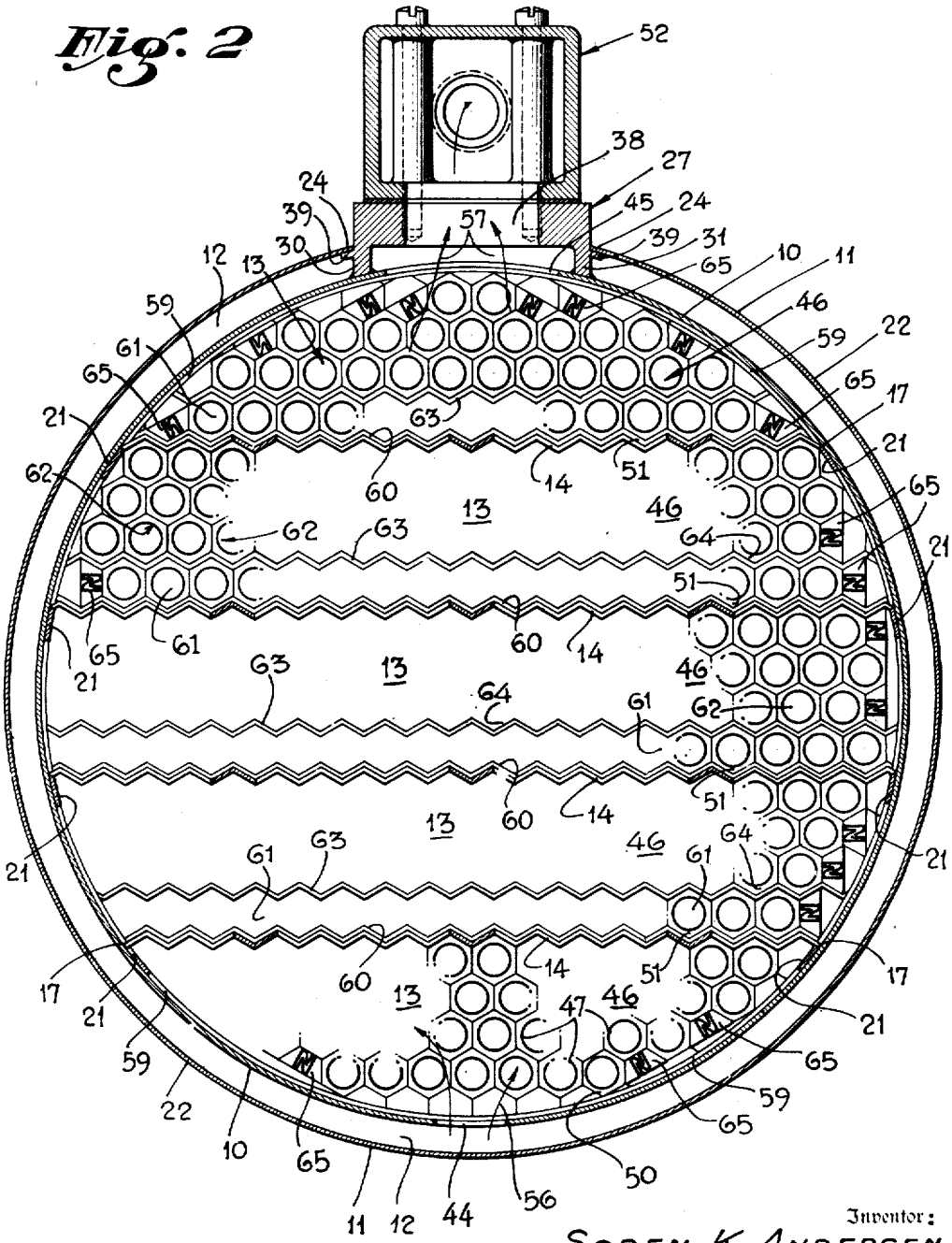
Fig. 2 is a cross sectional view taken as indicated by the line 2—2 of Fig. 1.

As best shown in Figs. 1 and 2, the oil cooler comprises a drum or shell 10 of tubular form, that is to say, this shell is open at both ends so as to have the characteristics of a tube. The shell 10 is preferably cylindric, and around the exterior there is a muff 11 defining a warm up chamber 12. The interior of the shell is divided into a series of flow chambers 13 by baffle plates 14 which are of rectangular outline, and extend from side to side of the shell 10, and have a length nearly as great as that of the shell 10.

Figure 5:
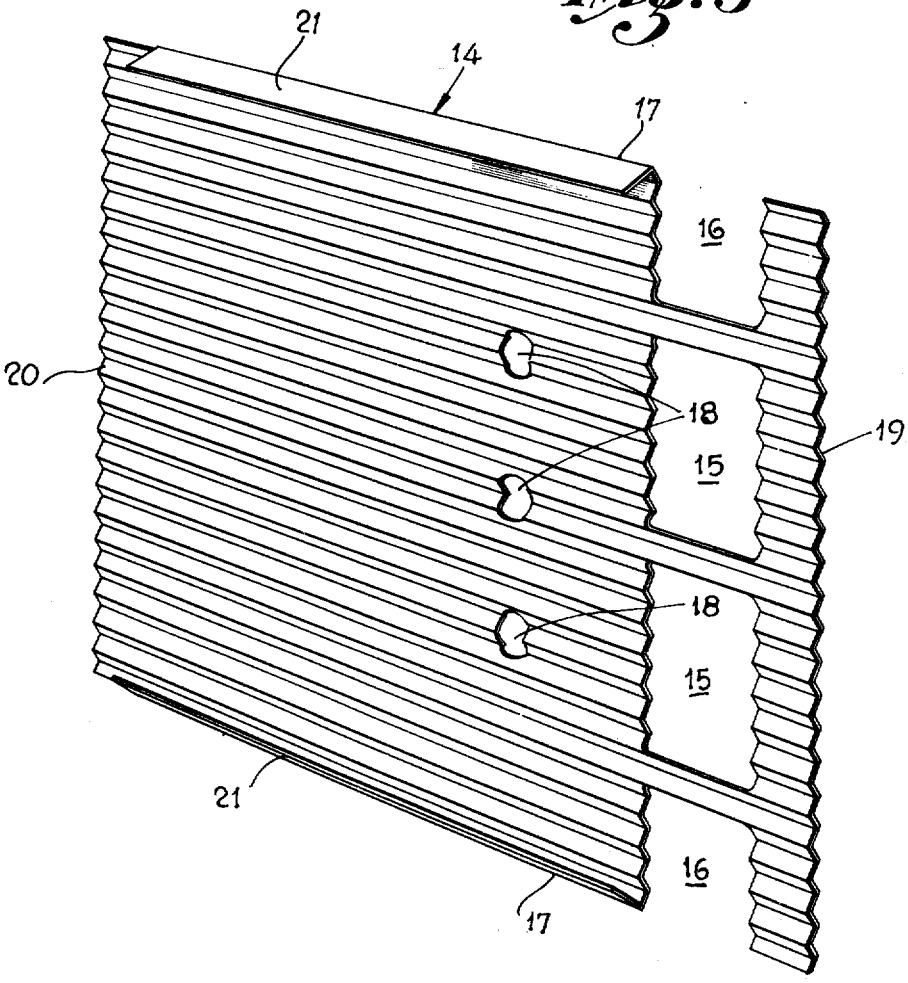
Fig. 5 is a perspective view of one of the baffle plates of the cooler.

Referring to Fig. 5, each baffle plate 14 has near one end port means consisting of aligned openings 15 and 16. The openings 16 are close to the side edges, and preferably are open to the side edges 17, for a purpose which will be hereinafter described. Between the ports 15 and 16 and the center of the plate there are supplementary openings 18. The baffle plate 14 is of wave form, at least the ends 19 and 20 thereof, to cooperate with hexagonal tube ends, as shown in Fig. 2. Along the side of the baffle plate, between the ends 19 and 20, there are flanges 21 for engagement with the inner face of the shell 10, also as shown in Fig. 2.

Figure 4:
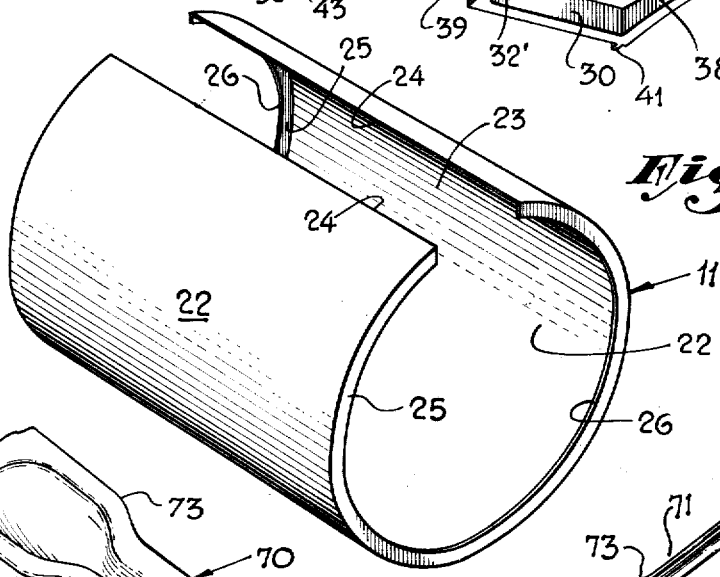
Fig. 4 is a perspective view, to reduced scale, of the cooler muff.

The muff 11, as shown in Fig. 4, comprises a wall 22 curved to near cylindric form so that there will be a space 23 between the ends 24 of the wall 22. Flanges 25 are bent inward from the curved edges of the wall 22, the inner edges 26 of these flanges 25 engaging the external face of the shell 10, and being joined therewith, as by soldering, so as to form the end closures for the warm-up chamber 12 of the cooler.

Figure 3:
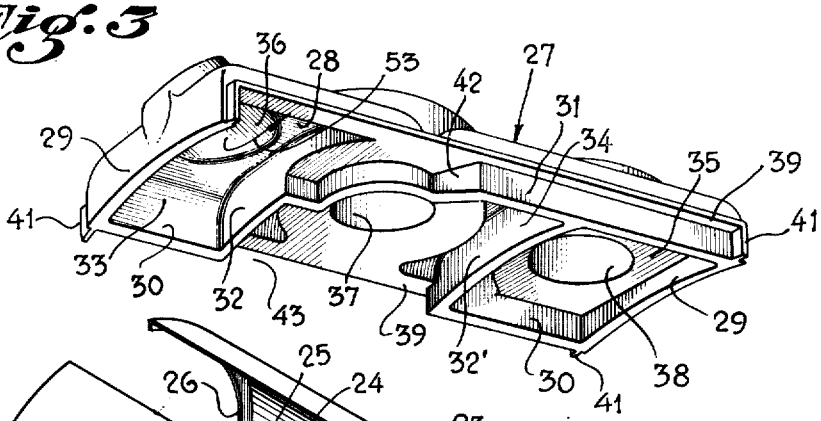
Fig. 3 is a perspective view looking toward the bottom of the inlet and outlet fitting of the cooler.

The muff 11 is mounted on the shell 10 so that the gap 23 between the ends 24 thereof will be disposed at the top of the cooler, and in this space there is a fitting 27 having the general form of an inverted rectangular pan. This fitting, as shown in Fig. 3, has a top wall 28, end walls 29, and side walls 30 and 31, defining within the fitting 27 a space which is divided by transverse walls 32 and 32' into an inlet chamber 33, bypass chamber 34, and outlet chamber 35, with cooperating inlet port 36, bypass port 37, and outlet port 38, all of which are preferably formed in the top wall 28 of the fitting 27. Along each side wall 30 and 31 of the fitting 27, there is an outstanding lip 39, the upper portion of which lip extends parallel to the upper face of the shell 10, and the end portions 41 of the lip curve downward to meet the face of the shell 10. These lips 39 project under the ends 24 of the wall 22 from which the muff 11 is formed, and the end portions 41 of the lips lie within the ends of the flanges 25 of the drum and muff 11. The ends 24 of the muff 11 and the lip 39 of the fitting, lying thus in overlapping relation, are soldered together so that strong joints are made therebetween. The lower faces of the walls 29, 30, 31, 32, and 32', which engage the upper surface of the shell 10, are soldered to the shell so that the fitting 27 is rigidly secured in place.

Referring again to Fig. 3, it will be noted that the forward interior portion of the side wall 31 is cut away, below the lip 39, to provide a port 42 for connecting the inlet chamber 33 of the fitting 37 with one end of the warm up chamber 12. This port 42 extends from the partition wall 32 to a point proximate to the end wall 29 of the inlet chamber 33. The side wall 30 of the fitting 27 is cut away between the partition walls 32 and 32', and below the lip 39 which projects outward from the side wall 30, to provide a port 43 which connects the other end of the warm up chamber 12 with the bypass chamber 34 of the fitting 27.

As shown in Fig. 1, the baffle plates 14 are alternated with respect to the ports thereof so that the ports 15 and 16 of consecutive baffle plates will be disposed at opposite ends of the cooler. These ports 15 and 16 and likewise the supplementary ports 18 connect the sections 13 in series so that a zig-zag path for the flow of oil to be cooled will be formed from cooler inlet ports 44 in the bottom of the shell 10 to a cooler outlet port 45 in the top of the shell 10 which communicates with the outlet chamber 35 of the fitting 27. Each of the sections 13 of the cooler contains a bundle 46 of cooler tubes 47 which extend longitudinally or from end to end of the shell and have at the ends thereof cooperating hexagonal enlargements 48 which are nested together so as to have the appearance of a honey comb, and which are secured together and to adjacent wall members of the cooler so as to close the ends of the sections 13, such securing of the hexagonal end portions 48 of the tubes being ordinarily accomplished by soldering.

The diametral dimensions of the enlargements 48 on the ends of the tubes 47 determine the spacing of the tubes, or, in other words, determine a relationship between the tubes which shall be referred to hereinafter as the normal spacing of the tubes. This normal spacing of the tubes is designed so as to provide relatively small interstices between the exteriors of adjacent tubes, through which the oil undergoing cooling action may flow in a manner to accomplish an efficient transfer of heat from the oil to the metal walls of the tubes 47. Each bundle of tubes 46 is so dimensionally formed with relation to the lateral dimensions of the chamber 13 in which it is contained as to provide between the sides of each bundle and the wall of the shell 10 a definite oil flow passage 50, and each bundle 46, lying above a baffle plate 14, is so formed with respect to the vertical dimension of the section 13 in which it is contained that a definite flow passage 51 is provided between such bundle and the upper face of the baffle plate 14 therebelow. The flow passages 50 result from the placement of circular spacer strips 59 within the ends of the shell 10. The flow passages 51 result from the placement of lateral spacer strips 60 between the end portions of the baffle plates 14 and the row 61 of tubes 47 immediately thereabove. This lower row or bank 61 of tubes in each section above the lowermost section is spaced at a distance from the row of tubes 62 thereabove, greater than normal, this being accomplished by placing between the ends 48 of the tubes in the first row 61 and the ends 48 of the tubes in the second row 62 lateral spacer strips 63. In this way lateral flow passages 64 are formed between the first and second rows of tubes 61 and 62.

Figure 8:
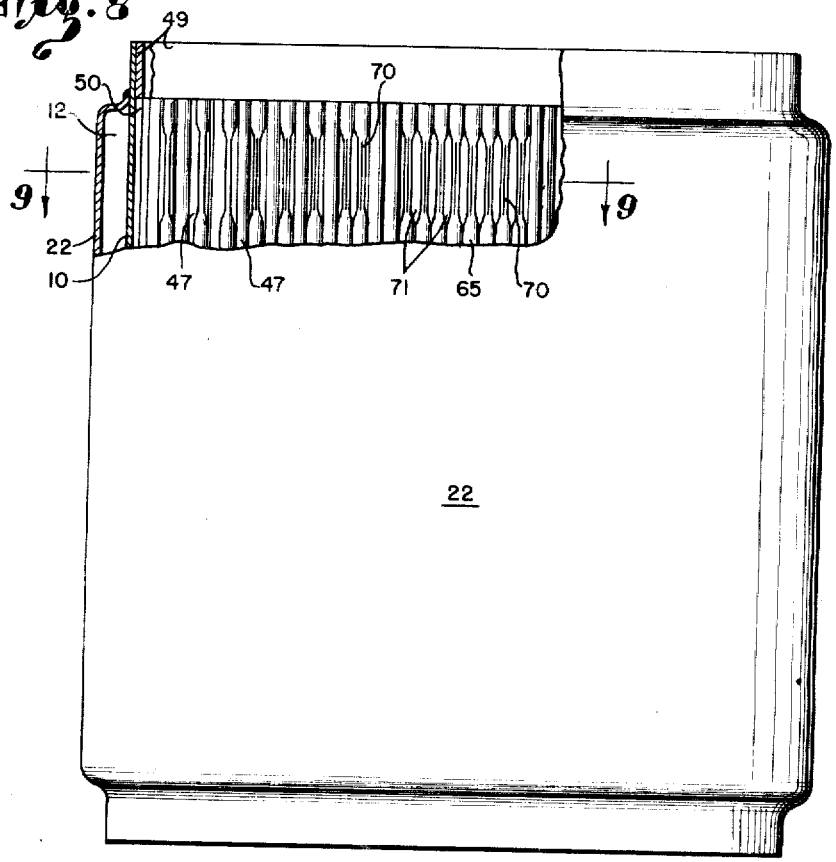
Fig. 8 is a view of one side of a cooler embodying the invention with portions of the warm up jacket and shell wall broken away to illustrate a core periphery composed of tubes of normal proportioning the shell dimensions.
Figure 9:
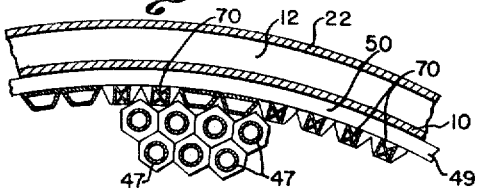
Fig. 9 is a detailed sectional view of the same taken as indicated by the line 9—9 of Fig. 8.

In Figs. 1 to 7 inclusive, the diameters of the tubes 47 and the hexagonal heads thereof are exaggerated with reference to the diameter of the cooler shell in order to simplify the drawings. In Figs. 8 and 9 respectively I have shown the result in a cooler core in which the tube dimensions are shown in substantially accurate conformity to conventional proportioning between tubes and shell of known coolers. Reference is of course made here to the relationship between the normal spacing between tubes on the one hand and tube diameter and shell diameter on the other hand. It will be noted that the spacer rings 59 provide, in conjunction with the tubes and half-tubes, a peripheral or header flow space which is well defined, which is not obstructed at any point, which receives heat throughout its length from the warm up chamber 12, and which, as a result of the foregoing characteristics, provides a relatively low resistance flow passage for the distribution of warmed oil to the low resistance flow passages 51 penetrating the core and also (through the apertures 71) to the intertube spaces immediately adjacent the core periphery, as described hereinabove. At the same time, because of the unobstructed characteristics of the flow passage and its connection to the low resistance flow passages 51, penetrating the cooler, excessive bypassing through the flow passage 50 is inhibited and sufficient resistance is developed therein to promote the penetration of the warmed oil to the core through the low resistance flow passages 51 and the apertures 71.

Figure 7:
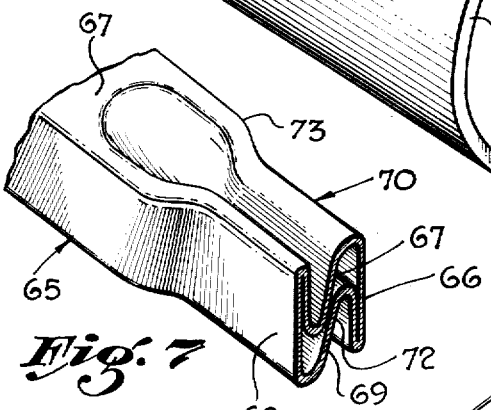
Fig. 7 is an enlarged fragmentary section taken as indicated by the line 7—7 of Fig. 6.
Figure 6:
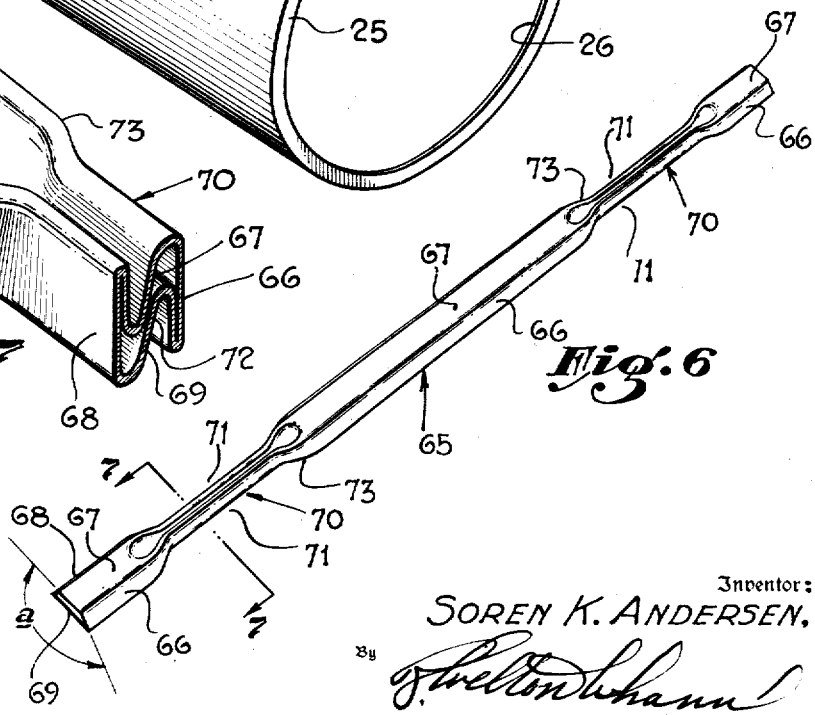
Fig. 6 is a perspective view of a pinched half-tube employed in the cooler.

In Figs. 6 and 7 I have shown the characteristics of the pinched half-tube 65 which is employed around the periphery of the core of the cooler in spaces where a regular, full sized, tube will not fit. This half-tube 65 has a cross section corresponding to half of a hexagon of the size of the normal tube ends or enlargements 48. It has three walls 66, 67, and 68 of the same width, the walls 66 and 68 being disposed at angles $a$ of 120° relative to the wall 67. A wall 69 connects the remaining edges of the walls 66 and 68 and is substantially twice the width of the wall 67. When two of the tubes 65 are placed together with the walls 69 thereof in abutment, the walls 66, 67, and 68 of the two tubes will define a hexagon, and the walls 69 of these tubes will define a diametral plane extending between two opposite ridges or points of the hexagon. Each of the tubes 65 has near its ends pinched sections 70 wherein the walls 66 and 68 are moved toward each other and are brought into substantially parallel relation and perpendicular to the wall 69, thereby forming in the opposite edges of the tubes 65 depressions or shallow notches which, when the tube member 65 is assembled in a cooler core, will provide apertures 71 for the flow of oil from the peripheral flow passage 50 into the interior of the core. Accordingly, the provision of these depressions 71 in the half-tubes 65 contribute in the cooler construction to the effect of obtaining a rapid recovery of the cooler, from a congealed or partially congealed condition.

The formation of the pinched sections is accomplished by depressing a portion 72 of the wall 69, forcing a portion 73 of the wall 67 opposite the wall portion 72 inward, and then squeezing the walls 66 and 68 toward each other so that the moved walls in the pinched sections define substantially a letter N, as shown in Fig. 7.

Since the passages 50 and 51 are each defined on one side by a wall which is not cooled by air flowing thereover, there can under practically no conditions be any waxing of the oil in contact with the uncooled wall, and there will be consequently no restriction of the passages on the uncooled side thereof under congealment conditions. This characteristic contributes to the "free flow" nature of the passages, and the invention provides for the maintenance of substantially unrestricted continuity of the passages through the cooler so as to provide a continuous flow channel of lower resistance under congealment conditions than the resistance of the passages between the tubes.

The flow through this branching system of free flow passages may thus be visualized by considering Figs. 1 and 2 simultaneously. From the core inlet 44, the oil will flow in a direction generally parallel to the longitudinal axis of the core, as indicated by the arrows 74. At the same time, the oil will spread circumferentially in the peripheral free flow passage 50 from the inlet 44 equally on either side of the bundle of tubes in the lowermost flow chamber 13. This combined axial and circumferential movement (along roughly helical flow paths) will bring the oil to the ports 16 at the two side extremities of the baffles 14 dividing the lowermost flow chamber 13 from the succeeding flow chamber 13. Then the "free flow" in the passages 50 will move in a generally axial direction, opposite to that which occurs in the lowermost chamber 13, with sufficient circumferential movement to bring the "free flow" stream up to the next baffle 14 in the side port (communicating with the shell wall) therein. The flow will alternate in this manner back and forth from end to end of the cooler on either side thereof until the two streams reach the uppermost flow chamber 13 in which they will converge by helical flow along the shell wall to the outlet 45.

The flow just described is the flow which occurs in what is herein referred to as the "free flow" channel from the inlet to the outlet. From this peripheral channel of flow, the warmed oil will be urged to penetrate the core in the core penetrating free flow passages 51 and 64 respectively adjacent the baffles and between the rows of tubes. These branching flows of oil will also move in a direction generally parallel to the longitudinal axis of the cooler, and from such branching flows, the oil will gradually penetrate the more restricted passages between the tubes so as to thaw out the congealed body of oil in the core.

Indicative of a practice now being followed with oil coolers, I have shown a valve fitting or device 52 connected to the fitting 27 so as to communicate with the ports 37 and 38. This valve device 52 has a bypass valve 53 to restrain flow of oil through the bypass chamber 34 during normal operation of the cooler. During such normal operation of the cooler, the hot oil flows through the inlet port 36 into the inlet chamber 33, as indicated by the arrow 54 in Fig. 1. This oil then flows laterally through the port 42 in the side wall 31 of the fitting 27, as indicated by the arrows 55 in Figs. 1 and 3, into one end of the warm up chamber 12. The oil then flows downward through the warm up chamber to the bottom of the cooler and enters the lowermost chamber 13 of the cooler core through the ports 44 in the bottom wall of the shell 10, as indicated by arrows 56. As indicated by full-line arrows 57, the oil flows serially through the consecutive flow chambers 13 to the outlet port 45 and thence on out through the valve device 52.

When oil becomes thickened or congealed in the flow chambers 13 of the cooler core, the bypass valve 53 may open under pressure of the oil which has built up in the warm up chamber 12, and there will then be a flow of oil through the full length of the warm up chamber 12 from the inlet chamber 33 of the fitting 27 to and through the bypass chamber 34. This partial or complete "freezing up" of the cooler core may result from the oil in the entire oil circulating system becoming cold—as, for example, when the engine has been shut down for a period of time, or a sudden drop in the temperature of the air passing through the tubes 47 may cause a partial or complete congealment of oil within the cooler core. When the bypass opens, the flow of heated oil through the warm up chamber 12 heats the shell 10 which then conducts heat to the oil in the clearly defined flow passages 50 lying adjacent the inner face of the shell. The flow will then spread through the branching system of free flow passages in the manner described above. The result of the free flow in the low resistance channels along the periphery of the core from the inlet to the outlet, and the branching flow from these channels penetrating the core, is to thaw out the entire interior of the cooler within a remarkably short period of time as compared to the time required to thaw out prior coolers of comparable efficiency.

While the warm up chamber has been disclosed as completely encircling the core, it is to be understood that the branching system of free flow passages can be employed in a cooler wherein the warm up chamber covers only a portion of the area of the shell.

I claim as my invention:

1. A cooler for liquids which are viscous when cold, comprising: a tubular shell, a warm up jacket surrounding said shell to impart heat to the outer surface of said shell, a plurality of baffle plates dividing the space within the shell into a series of oil flow path sections extending from side to side of the shell, liquid inlet means for the first section of said series, liquid outlet means for the last section of said series, alternate baffle plates being provided with ports at opposite ends of said sections with at least one of said ports in each baffle plate having its periphery partially defined by said shell to provide a zigzag path of flow serially through all of said sections in uninterrupted contact with the inner surface of said shell, a bundle of parallel open ended tubes within each of said sections and arranged in rows generally parallel to said baffle plates, the majority of the tubes of each bundle being relatively closely spaced for efficient heat exchange between liquid flowing between said tubes and cooling fluid passing through said tubes, means for spacing each end tube of each row from said shell to provide a free flow passage for viscous liquid adjacent the inner surface of said shell, means for spacing at least one row of tubes adjacent each baffle plate from the adjacent baffle plate to provide a free flow passage adjacent each baffle plate communicating with the aforementioned free flow passage adjacent the inner surface of said shell.

2. A cooler for liquids that are viscous when cold, comprising: a shell; means cooperating with the outer surface of said shell to define a warm up chamber from which heat may be imparted to the shell; baffle means dividing the space within said shell into a series of flow chambers each having at least one extremity in contact with the inner surface of said shell in an area covered by said warm up chamber; liquid inlet and outlet means communicating with said chambers, said baffle means and shell cooperating to define port means through which the liquid may flow from one of said flow chambers to another in uninterrupted contact with the inner surface of the shell; a bundle of parallel open ended tubes within each of said chambers, arranged in rows generally parallel to said baffle plate, the majority of said tubes of each bundle being relatively closely spaced for efficient heat exchange between liquid flowing between said tubes and cooling fluid passing through said tubes; means for spacing each baffle plate from an adjacent row of tubes a sufficient distance to provide a passage of less resistance to flow of the liquid under congealment conditions in which the liquid tends to congeal upon the tube surfaces, than the resistance of the passages between the tubes; and means for spacing tubes adjacent said shell a distance from said shell sufficient to provide passages adjacent the inner surface of the shell, of less resistance than the passages between the tubes, connecting the inlet means and outlet means respectively to said passages adjacent the baffle plates.

3. A cooler for liquids that are viscose when cold, comprising: a shell; means cooperating with the outer surface of said shell to define a warm up chamber from which heat may be imparted to the shell; baffle means dividing the space within the shell into a series of flow chambers, each having at least one extremity in contact with a heated area of the inner surface of the shell; liquid inlet and outlet means connected to respective chambers, said baffle means being provided with port means connecting said chambers in series between said inlet and outlet means to define a tortuous flow path through the cooler; a core comprising a bundle of parallel open ended tubes within each of said chambers, arranged in rows generally parallel to said baffle means, the majority of said tubes of each bundle being relatively closely spaced to provide relatively restricted passages for efficient heat exchange between liquid flowing in said passages and coolant passing through said tubes; means defining between each baffle plate and an adjacent row of tubes, a continuous core penetrating free flow passage of less resistance than said restricted passages under congealment conditions in which the liquid tends to congeal upon the tubes; and means defining between the aforesaid heated areas of said shell and the adjacent tubes, peripheral free flow passages of less resistance to flow than said restricted passages connecting the said core penetrating free flow passages to said inlet and outlet means respectively.

4. A cooler for liquids that are viscous when cold, comprising: a shell; means cooperating with the outer surface of said shell to define a warm up chamber from which heat may be imparted to the shell; baffle means dividing the space within the shell into a series of flow chambers, each having at least one extremity in contact with a heated area of the inner surface of the shell; liquid inlet means and outlet means connected to respective chambers, said baffle means being provided with port means connecting said chambers in series with said inlet and outlet means to define a tortuous flow path; a core comprising a bundle of parallel open ended tubes within each of said chambers, arranged in rows generally parallel to said baffle plates, the majority of said tubes of each bundle being relatively closely spaced to define relatively restricted passages for efficient heat exchange between liquid flowing between said tubes and coolant passing through said tubes; means defining between said heated areas of the shell and the tubes adjacent said areas, a series of free flow passages which are connected to said inlet and outlet means and through said port means to provide a substantially continuous peripheral free flow channel which is of less resistance to the flow of the liquid under congealment conditions in which the liquid adheres to the tubes, than the resistance of said restricted passages; and means defining between said baffle means and an adjacent row of tubes a free flow passage of less resistance to the flow of said liquid under said congealment conditions than the resistance of said restricted passages, said last mentioned free flow passage being in communication with said peripheral free flow passage and penetrating the core to convey into the core warmed liquid for facilitating the thawing of the core when it is congealed.

5. A cooler for liquids that are viscous when cold, comprising: a shell; means cooperating with the outer surface of said shell to define a warm up chamber from which heat may be imparted to the shell; baffle means dividing the space within the shell into a series of flow chambers, each having at least one extremity in communication with the inner surface of the shell; liquid inlet and outlet means connected to respective chambers, said baffle means being provided with port means connecting said chambers in series to provide a continuous tortuous flow path between said inlet and outlet means; a core comprising a bundle of parallel open ended tubes within each of said chambers arranged in rows generally parallel to said baffle plates, the majority of the tubes of each bundle being relatively closely spaced to provide relatively restricted passages for efficient heat exchange between liquid flowing in said passages and coolant passing through said tubes; means providing in each of said chambers a core penetrating free flow passage between adjacent rows of tubes of greater spacing and less flow resistance than the aforesaid relatively close spacing of the majority of the tubes to facilitate penetration of the liquid into said bundles when the liquid is viscous; and means for spacing tubes from the inner surface of the shell to provide peripheral free flow passages adjacent said areas, of less resistance to flow of the liquid under congealment conditions in which the liquid adheres to the tubes, than the resistance of the spaces between said majority of tubes, said peripheral free flow passages connecting said inlet and outlet means with said core penetrating free flow passages.

6. A cooler for liquids that are viscous when cold comprising: a shell; means cooperating with the outer surface of said shell to define a warm up chamber from which heat may be imparted to the shell; baffle means dividing the space within the shell into a series of liquid flow chambers, each having at least one extremity in contact with a heated area of the inner surface of the shell; liquid inlet and outlet means connected to respective chambers, said baffle means being provided with port means connecting said chambers in series between said inlet and outlet means; a core comprising a bundle of parallel open ended tubes within each of said chambers, arranged in rows generally parallel to said baffle means, the majority of said tubes of each bundle being relatively closely spaced to provide relatively restricted passages for the efficient heat exchange between liquid flowing in said passages and coolant passing through said tubes; spacing strips interposed between said baffle means and the ends of an adjacent row of tubes to provide core penetrating free flow passages of less resistance than said restricted passages, to the flow of liquid under congealment conditions in which the liquid adheres to the tubes; and spacer rings interposed between the ends of said tubes and the shell to define peripheral free flow passages between said heated areas of the inner surface of said shell and adjacent tubes, said peripheral free flow passages connecting said inlet and outlet means respectively to said core penetrating free flow passages to provide a branching system of free flow passages for conveying warmed liquid into the core, and said peripheral free flow passages being serially connected by said port means to provide in said system a substantially continuous free flow channel extending from said inlet to said outlet means.

7. A cooler for liquids that are viscous when cold, comprising: a shell; means cooperating with the outer surface of said shell to define a warm up chamber from which heat may be imparted to the shell; baffle means dividing the space within the shell into a series of liquid flow chambers, each having at least one extremity in contact with a heated area of the inner surface of the shell; liquid inlet and outlet means connected to respective chambers, said baffle means and shell cooperating to define port means serially connecting said chambers; a bundle of parallel open ended tubes in each of said chambers arranged in rows generally parallel to said baffle means, the majority of said tubes of each bundle being spaced relatively closely to provide restricted passages for the efficient heat exchange between liquid flowing in said passages and coolant passing through said tubes; and spacing means providing, between said baffle means and at least one row of tubes adjacent thereto, and between said heated areas of the shell and tubes adjacent thereto, a branching system of peripheral and core penetrating free flow passages of less resistance to the flow of liquid that has become so cold and viscous as to adhere to the tubes, than the resistances of said restricted passages under said conditions, said peripheral free flow passages being serially connected by said port means to provide a substantially continuous free flow channel extending from said inlet means to said outlet means in substantially uninterrupted contact with said heated areas of the shell.

8. A cooler for liquids that are viscous when cold, comprising: a shell; means cooperating with the outer surface of said shell to define a warm up chamber from which heat may be imparted to the shell; baffle means dividing the space within said shell into a series of flow chambers each having at least one extremity in contact with the inner surface of said shell in an area covered by said warm up chamber; liquid inlet and outlet means communicating with said chambers, said baffle means and shell cooperating to define port means through which the liquid may flow from one of said flow chambers to another in uninterrupted contact with the inner surface of the shell; a bundle of parallel open ended tubes within each of said chambers, arranged in rows generally parallel to said baffle plate, the majority of said tubes of each bundle being relatively closely spaced for efficient heat exchange between liquid flowing between said tubes and cooling fluid passing through said tubes; means for spacing each baffle plate from an adjacent row of tubes a sufficient distance to provide a passage of less resistance to flow of the liquid under congealment conditions in which the liquid tends to congeal upon the tube surfaces, than the resistance of the passages between the tubes; means providing in each of said chambers a core penetrating free flow passage between adjacent rows of tubes of greater spacing and less resistance than the aforesaid relatively close spacing of the majority of tubes to facilitate penetration of the liquid into said bundles when the liquid is viscous; and means for spacing tubes adjacent said shell a distance from said shell sufficient to provide passages adjacent the inner surface of the shell, of less resistance than the majority of passages between the tubes, connecting the inlet means and outlet means respectively to said passages adjacent the baffle plates, and said free flow passages.

9. A cooler for liquids that are viscous when cold, comprising: a shell; means defining a warm up chamber exteriorly of the shell; baffle means dividing the interior of the shell into a tortuous flow passage one side of which is in contact with the inner surface of the shell in an area covered by said warm up chamber, said flow passage having an inlet and an outlet; a bundle of open-ended tubes within each portion of the flow passage disposed between the baffles, said tubes being in rows generally parallel to said baffles and the majority of said tubes of each bundle being relatively closely spaced; means for spacing the tubes adjacent said shell a distance from the inner surface of the heated area of said shell sufficient to provide a continuous passage, adjacent said inner surface, of less resistance than the passages between said tubes; and means for spacing each baffle plate from an adjacent row of tubes a sufficient distance to provide a passage of less resistance to the flow of liquid than the above mentioned spacing of the tubes, said passage being connected in the above mentioned passage of less resistance.

10. The invention defined by claim 9 wherein there is means for providing, in each of the portions of the flow path between the baffles, a core penetrating free flow passage between adjacent rows of tubes of greater spacing and less flow resistance than the aforesaid relatively close spacing of the majority of tubes, said free flow passage having one side in communication with said continuous passage.

11. A cooler for liquids that are viscous when cold, comprising: a shell; means cooperating with the outer surface of said shell to define a warm up chamber from which heat may be imparted to the shell; baffle means dividing the space within the shell into a series of flow chambers, each having at least one extremity in contact with a heated area of the inner surface of the shell; liquid inlet and outlet means connected to respective chambers, said baffle means being provided with ports connecting said chambers in series between said inlet and outlet means to define a tortuous flow path through the cooler; a core comprising a bundle of parallel open ended tubes within each of said chambers, arranged in rows generally parallel to said baffle means, the majority of said tubes of each bundle being relatively closely spaced to provide relatively restricted passages for efficient heat exchange between liquid flowing in said passages and coolant passing through said tubes; means defining between each baffle plate and an adjacent row of tubes, a continuous core penetrating free flow pasage of less resistance than said restricted passages under congealment conditions in which the liquid tends to congeal upon the tubes; and means defining between the aforesaid heated areas of said shell and the adjacent tubes, peripheral free flow passages connecting the said core penetrating free flow passages to said inlet and outlet means respectively, certain of said ports in said baffle means being positioned in said peripheral free flow passages to permit liquid flowing through said peripheral free flow passages to pass from one flow chamber to another.

12. A cooler for liquids that are viscous when cold, comprising: a shell; means cooperating with the outer surface of said shell to define a warm up chamber from which heat may be imparted to the shell; baffle means dividing the space within the shell into a series of flow chambers, each having at least one extremity in contact with a heated area of the inner surface of the shell; liquid inlet and outlet means connected to respective chambers, said baffle means being provided with ports connecting said chambers in series between said inlet and outlet means to define a tortuous flow path through the cooler; a core comprising a bundle of parallel open ended tubes within each of said chambers, arranged in rows generally parallel to said baffle means, the majority of said tubes of each bundle being relatively closely spaced to provide relatively restricted passages for efficient heat exchange between the liquid flowing in said passages and coolant passing through said tubes; means defining between the aforesaid heated area of said shell and adjacent tubes, peripheral free-flow passages, said peripheral free-flow passages being connected to said liquid inlet and liquid outlet means, and the portions of said peripheral free-flow passages in said flow chambers being connected to each other through said port means thus forming a tortuous peripheral free-flow passage from said liquid inlet to said liquid outlet means; and continuous core penetrating free-flow passage means extending laterally into said core from said peripheral free-flow passages whereby oil in said peripheral free-flow passages may flow inwardly from the side of said core into the central portion of said core.

13. A heat exchange unit of the class described comprising a supporting-shell, means defining a warm-up chamber, baffle-means arranged in said shell axially thereof with the opening in one baffle-means located at the opposite end from that in adjacent baffle-means whereby the interior of said shell is formed into a tortuous fluid-flow passage extending axially of said shell with one side of said passage contiguous to said warm-up chamber, a bundle of open-ended tubes disposed in rows parallel to said baffle means and uniformly spaced apart between adjacent baffle-means so as to establish a predetermined resistance to fluid flow through said tortuous shell passage, and means spacing a row of said tubes along one or more of said baffle-means away from the respective baffle-means a distance greater than the otherwise uniform spacing of said rows of tubes whereby the resistance to fluid flow adjacent said baffle-means is less than that established by said uniform spacing of said tubes between adjacent baffles.

14. A heat exchange unit of the class described comprising: a substantially cylindrical shell; means defining a warm-up chamber on the exterior of said shell, inlet and outlet passages whereby hot fluid may flow through said warm-up chamber; baffle-means within said shell extending axially of said shell with the opening in one baffle-means located at the opposite end from that in adjacent baffle-means, said shell being thereby formed into a tortuous fluid-flow passage extending axially of said shell, with one side of said passage contiguous to said warm-up chamber; a bundle of open-ended tubes disposed in rows parallel to said baffle-means and axially of said shell, a majority of said tubes being uniformly spaced apart between adjacent baffle-means so as to establish a predetermined resistance to fluid flow through said axially tortuous shell passage; and means spacing a row of said tubes along one or more of said baffle-means away from the respective baffle-means a distance greater than the uniform spacing of said rows of tubes whereby the resistance to fluid flow adjacent said baffle-means is less than that established by said uniform spacing of said tubes between adjacent baffles 15. A heat exchange unit of the class described comprising a supporting-shell, means defining a warm-up chamber, baffle-means arranged in said shell axially thereof with the opening in one baffle-means located at the opposite end from that in adjacent baffle-means whereby the interior of said shell is formed into a tortuous fluid-flow passage extending axially of said shell with one side of said passage contiguous to said warm-up chamber, a bundle of open-ended tubes disposed in rows parallel to said baffle-means and axially of said shell, a majority of said tubes being uniformly spaced apart between adjacent baffle-means so as to establish a predetermined resistance to fluid flow through said tortuous shell passage, and means spacing a row of said tubes along one or more of said baffle-means away from the respective baffle-means a distance greater than the uniform spacing of the majority of said rows of tubes whereby the resistance to fluid flow adjacent said baffle-means is less than that established by said uniform spacing of said tubes between adjacent baffles, one edge of the larger space between the baffle and the row of tubes extending to said shell where said shell is warmed by said warm-up chamber.

SOREN K. ANDERSEN.

REFERENCES CITED

The following references are of record in the file of this patent:

UNITED STATES PATENTS

| Number | Name | Date |
|---|---|---|
| 1,864,052 | Dykeman et al. | June 21, 1932 |
| 1,923,404 | White et al. | Aug. 22, 1933 |
| 2,071,106 | Blair | Feb. 16, 1937 |
| 2,270,864 | Blais | Jan. 27, 1942 |
| 2,307,300 | Ramsaur | Jan. 5, 1943 |
| 2,354,362 | Burns | July 25, 1944 |
| 2,359,448 | Shaw | Oct. 3, 1944 |
| 2,359,533 | Shogran | Oct. 3, 1944 |
| 2,373,157 | Worth | Apr. 10, 1945 |

No new references cited in reissue application.

Certificate of Correction

Reissue No. 23,144 September 6, 1949

SOREN K. ANDERSEN

It is hereby certified that error appears in the printed specification of the above numbered patent requiring correction as follows:

Column 9, line 6, for the word "viscose" read *viscous*;

and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*